US012663789B2

(12) United States Patent　　(10) Patent No.:　US 12,663,789 B2

Konno et al.　　(45) Date of Patent:　Jun. 23, 2026

(54) COATING DIAGNOSIS SYSTEM AND COATING DIAGNOSIS METHOD

(71) Applicant: KABUSHIKI KAISHA YASKAWA DENKI, Kitakyushu (JP)

(72) Inventors: Tsuyoshi Konno, Kitakyushu (JP); Yoshie Maeda, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 573 days.

(21) Appl. No.: 18/057,541

(22) Filed: Nov. 21, 2022

(65) Prior Publication Data

US 2023/0166288 A1　　Jun. 1, 2023

(30) Foreign Application Priority Data

Nov. 26, 2021　(JP) ................................. 2021-192577

(51) Int. Cl.
| | |
|---|---|
| *G05B 23/02* | (2006.01) |
| *B05D 7/14* | (2006.01) |
| *B25J 11/00* | (2006.01) |
| *G06T 7/00* | (2017.01) |

(52) U.S. Cl.
CPC ........... *G05B 23/0283* (2013.01); *B05D 7/14* (2013.01); *B25J 11/0075* (2013.01); *G06T 7/0004* (2013.01); *G06T 2207/30156* (2013.01); *G06T 2207/30164* (2013.01)

(58) Field of Classification Search
CPC ..................... G05B 23/0283; G05B 19/41875; B05D 7/14;

B25J 11/0075; G06T 7/0004; G06T 2207/30156; G06T 2207/30164; Y02P 90/02; B05B 13/0431; B05B 16/20
See application file for complete search history.

(56) References Cited

U.S. PATENT DOCUMENTS

| | | | | |
|---|---|---|---|---|
| 5,514,423 A | * | 5/1996 | Krish ..................... | B05D 1/045 |
| | | | | 427/470 |
| 2015/0042716 A1 | | 2/2015 | Beier et al. | |

(Continued)

FOREIGN PATENT DOCUMENTS

| | | | | |
|---|---|---|---|---|
| CN | 107614213 A | | 1/2018 | |
| CN | 108176550 | * | 3/2018 | ............. B05B 16/20 |

(Continued)

OTHER PUBLICATIONS

OA issued on May 26, 2023_JP Application No. 2021-192577.

(Continued)

*Primary Examiner* — Eric J Yoon
(74) *Attorney, Agent, or Firm* — Osha Bergman Watanabe & Burton LLP

(57)　　　ABSTRACT

To provide a coating diagnosis system and a coating diagnosis method that allow centralized management over data related to processes in a painting line, including a pretreatment process. The coating diagnosis system includes a data acquisition unit of a pretreatment controller that acquires data related to a pretreatment process when pretreatment for paint is performed on a workpiece in the pretreatment process in a painting line, and a data management unit of a host controller that registers the data related to the pretreatment process in a database in associated with a serial number of the workpiece.

16 Claims, 7 Drawing Sheets

(56) References Cited

U.S. PATENT DOCUMENTS

| | | | |
|---|---|---|---|
| 2016/0174792 A1* | 6/2016 | Williamson | A46B 13/00 |
| | | | 15/383 |
| 2018/0107198 A1* | 4/2018 | Linder | G06F 3/011 |
| 2018/0133897 A1 | 5/2018 | Shimizu | |
| 2022/0016671 A1* | 1/2022 | van Mechelen | B05D 7/534 |
| 2022/0066426 A1* | 3/2022 | Czinger | B33Y 10/00 |
| 2022/0197271 A1 | 6/2022 | Alt et al. | |
| 2022/0214670 A1* | 7/2022 | Herre | B05B 12/084 |
| 2022/0214671 A1* | 7/2022 | Alt | G05B 19/41875 |
| 2022/0214676 A1 | 7/2022 | Gienger et al. | |
| 2022/0215305 A1 | 7/2022 | Wieland et al. | |
| 2022/0219182 A1 | 7/2022 | Winter et al. | |
| 2022/0237064 A1 | 7/2022 | Alt et al. | |
| 2022/0379472 A1* | 12/2022 | Takebayashi | B25J 9/1664 |
| 2023/0034262 A1 | 2/2023 | Kurihara et al. | |
| 2023/0158540 A1 | 5/2023 | Yoshioka et al. | |
| 2024/0033911 A1* | 2/2024 | Yajima | B25J 9/1689 |
| 2024/0135289 A1 | 4/2024 | Wieland et al. | |

FOREIGN PATENT DOCUMENTS

| | | | |
|---|---|---|---|
| CN | 112547352 A | 3/2021 | |
| CN | 112955262 A | 6/2021 | |
| JP | H0857376 A | 3/1996 | |
| JP | 2002-307000 A | 10/2002 | |
| JP | 2003-295925 A | 10/2003 | |
| JP | 2015520011 A | 7/2015 | |
| JP | 2018195170 A | 12/2018 | |
| JP | 2019113338 A | 7/2019 | |
| JP | 2021109173 A | 8/2021 | |
| JP | 2021111130 A | 8/2021 | |
| JP | 2021131692 A | 9/2021 | |
| WO | 2020/224715 A1 | 11/2020 | |

OTHER PUBLICATIONS

Office Action issued in counterpart Chinese Patent Application No. 202211304662.9 mailed May 31, 2025 (25 pages).
Office Action issued in the counterpart Chinese application No. 202211304662.9, mailed Oct. 16, 2025 (18 pages).

* cited by examiner

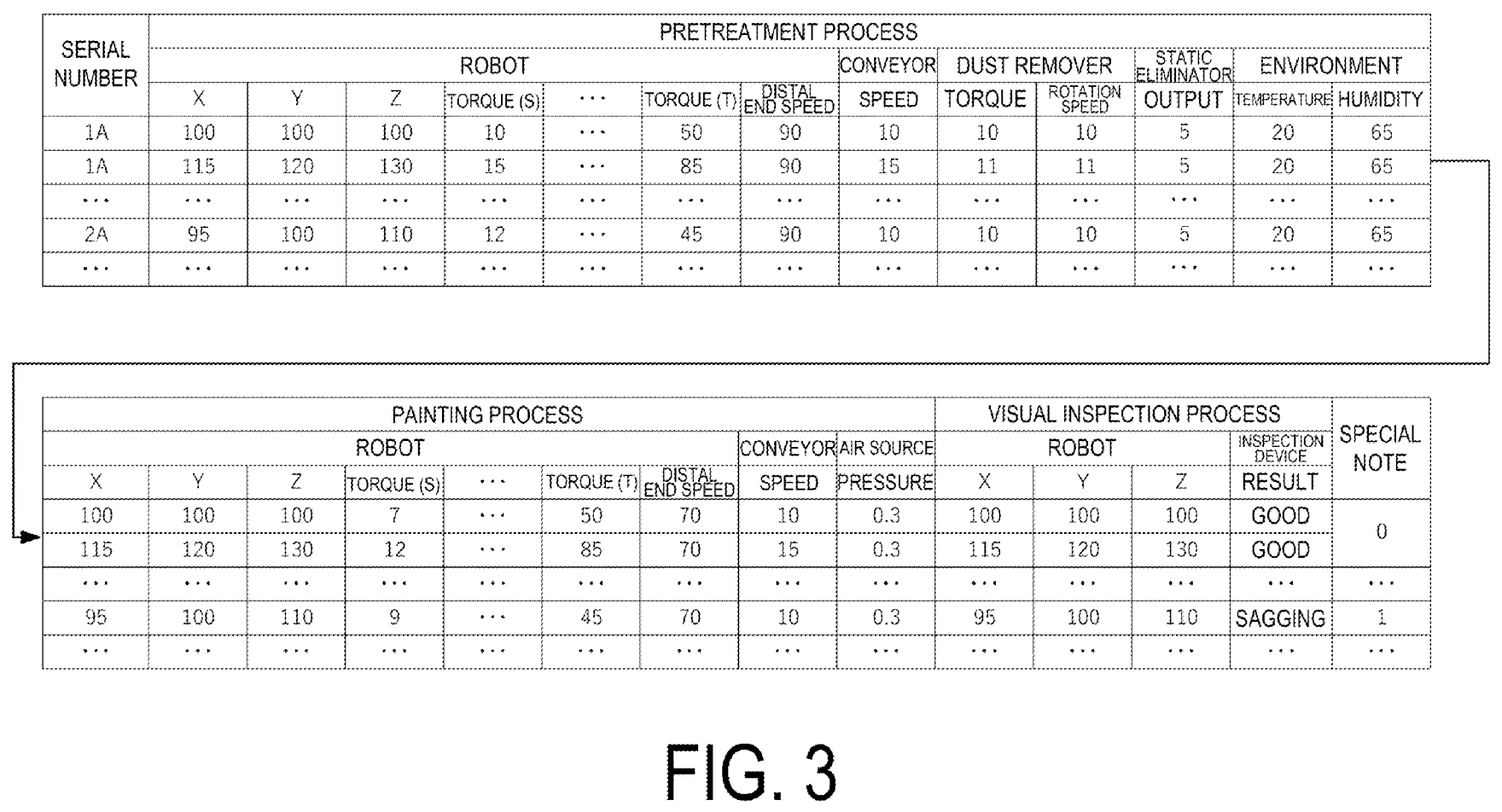

PRETREATMENT PROCESS

| SERIAL NUMBER | ROBOT | | | | | | | CONVEYOR | DUST REMOVER | | STATIC ELIMINATOR | ENVIRONMENT | |
|---|---|---|---|---|---|---|---|---|---|---|---|---|---|
| | X | Y | Z | TORQUE (S) | ... | TORQUE (T) | DISTAL END SPEED | SPEED | TORQUE | ROTATION SPEED | OUTPUT | TEMPERATURE | HUMIDITY |
| 1A | 100 | 100 | 100 | 10 | ... | 50 | 90 | 10 | 10 | 10 | 5 | 20 | 65 |
| 1A | 115 | 120 | 130 | 15 | ... | 85 | 90 | 15 | 11 | 11 | 5 | 20 | 65 |
| ... | ... | ... | ... | ... | ... | ... | ... | ... | ... | ... | ... | ... | ... |
| 2A | 95 | 100 | 110 | 12 | ... | 45 | 90 | 10 | 10 | 10 | 5 | 20 | 65 |
| ... | ... | ... | ... | ... | ... | ... | ... | ... | ... | ... | ... | ... | ... |

PAINTING PROCESS

| ROBOT | | | | | | | CONVEYOR | AIR SOURCE |
|---|---|---|---|---|---|---|---|---|
| X | Y | Z | TORQUE (S) | ... | TORQUE (T) | DISTAL END SPEED | SPEED | PRESSURE |
| 100 | 100 | 100 | 7 | ... | 50 | 70 | 10 | 0.3 |
| 115 | 120 | 130 | 12 | ... | 85 | 70 | 15 | 0.3 |
| ... | ... | ... | ... | ... | ... | ... | ... | ... |
| 95 | 100 | 110 | 9 | ... | 45 | 70 | 10 | 0.3 |
| ... | ... | ... | ... | ... | ... | ... | ... | ... |

VISUAL INSPECTION PROCESS

| ROBOT | | | INSPECTION DEVICE | SPECIAL NOTE |
|---|---|---|---|---|
| X | Y | Z | RESULT | |
| 100 | 100 | 100 | GOOD | 0 |
| 115 | 120 | 130 | GOOD | ... |
| ... | ... | ... | ... | ... |
| 95 | 100 | 110 | SAGGING | 1 |
| ... | ... | ... | ... | ... |

FIG. 3

PRETREATMENT PROCESS

| SERIAL NUMBER | ROBOT | | | | | | | CONVEYOR | DUST REMOVER | | STATIC ELIMINATOR | | ENVIRONMENT | |
| | X | Y | Z | TORQUE (S) | ... | TORQUE (T) | DISTAL END SPEED | SPEED | TORQUE | ROTATION SPEED | OUTPUT | AMOUNT OF CHARGE | TEMPERATURE | HUMIDITY |
|---|---|---|---|---|---|---|---|---|---|---|---|---|---|---|
| 1A | 100 | 100 | 100 | 10 | ... | 50 | 90 | 10 | 10 | 10 | 5 | 5 | 20 | 65 |
| 1A | 115 | 120 | 130 | 15 | ... | 85 | 90 | 15 | 11 | 11 | 5 | 5 | 20 | 65 |
| ... | ... | ... | ... | ... | ... | ... | ... | ... | ... | ... | ... | ... | ... | ... |
| 2A | 95 | 100 | 110 | 12 | ... | 45 | 90 | 10 | 10 | 10 | 5 | 5 | 20 | 65 |
| ... | ... | ... | ... | ... | ... | ... | ... | ... | ... | ... | ... | ... | ... | ... |

PAINTING PROCESS

| ROBOT | | | | | | | CONVEYOR | AIR SOURCE |
| X | Y | Z | TORQUE (S) | ... | TORQUE (T) | DISTAL END SPEED | SPEED | PRESSURE |
|---|---|---|---|---|---|---|---|---|
| 100 | 100 | 100 | 7 | ... | 50 | 70 | 10 | 0.3 |
| 115 | 120 | 130 | 12 | ... | 85 | 70 | 15 | 0.3 |
| ... | ... | ... | ... | ... | ... | ... | ... | ... |
| 95 | 100 | 110 | 9 | ... | 45 | 70 | 10 | 0.3 |
| ... | ... | ... | ... | ... | ... | ... | ... | ... |

VISUAL INSPECTION PROCESS

| ROBOT | | | INSPECTION DEVICE | SPECIAL NOTE |
| X | Y | Z | RESULT | |
|---|---|---|---|---|
| 100 | 100 | 100 | GOOD | 0 |
| 115 | 120 | 130 | GOOD | ... |
| ... | ... | ... | ... | 1 |
| 95 | 100 | 110 | SAGGING | ... |
| ... | ... | ... | ... | ... |

FIG. 6

COATING DIAGNOSIS SYSTEM AND COATING DIAGNOSIS METHOD

CROSS-REFERENCE TO RELATED APPLICATIONS

This application claims priority pursuant to 35 U.S.C. 119(a) to Japanese Application No. 2021-192577, filed Nov. 26, 221, which application is incorporated herein by reference in its entirety.

TECHNICAL FIELD

Embodiments of the present disclosure relate to a coating diagnosis system and a coating diagnosis method.

BACKGROUND ART

Patent Document 1 describes a remote management system for a painting pretreatment line. The remote management system includes a treatment line terminal installed on the painting pretreatment line and a remote management server connected to the treatment line terminal via a communication line. The treatment line terminal transmits operation status data of the painting pretreatment line to the remote management server. The remote management server monitors the operation status of the painting pretreatment line on the basis of the operation status data received from the treatment line terminal. Patent Document 1: JP 2002-307000 A.

SUMMARY OF INVENTION

Technical Problem

The quality of the final coating in a painting line is greatly influenced not only by the quality of a painting process but also by the quality of a pretreatment process. Thus, there has been a demand for a coating diagnosis system that allows centralized management over data related to processes in the painting line, including a pretreatment process.

The present invention has been made in view of this problem, and an object thereof is to provide a coating diagnosis system and a coating diagnosis method that allow centralized management over data related to processes in a painting line, including a pretreatment process.

Solution to Problem

To solve the above problem, according to one aspect of the present invention, a coating diagnosis system is applied, which includes a first data acquisition unit configured to acquire data related to a pretreatment process when pretreatment for painting is performed on a workpiece in the pretreatment process in a painting line, and a data management unit configured to register the data related to the pretreatment process in association with identification information on the workpiece.

According to another aspect of the present invention, a coating diagnosis method is applied, which includes acquiring data related to a pretreatment process when pretreatment for painting is performed on a workpiece in the pretreatment process in a painting line, and registering the data related to the pretreatment process in association with identification information on the workpiece.

Advantageous Effects of Invention

According to the coating diagnosis system and the like of the present invention, the data related to the processes in the painting line including the pretreatment process can be managed centrally.

BRIEF DESCRIPTION OF DRAWINGS

FIG. 3 is a table showing an example of data contents of a database.

FIG. 6 is a table showing an example of data contents of a database in the modified example in which the pretreatment process is performed outside the explosion-proof area.

DESCRIPTION OF EMBODIMENTS

Embodiments will be described below with reference to the drawings.

1. Overall Configuration of Coating Diagnosis System

An example of an overall configuration of a coating diagnosis system 1 according to the embodiment will be described with reference to FIG. 1.

The coating diagnosis system 1 is a system for diagnosing the quality of coating performed on a workpiece W in a painting line PL. In the present embodiment, a case where the workpiece W is, for example, a body of an automobile will be described. Note that the type of workpiece W is not limited as long as the pretreatment for painting is performed, and the coating diagnosis system 1 can be applied to other types of workpieces besides the body of the automobile.

Figure 1:
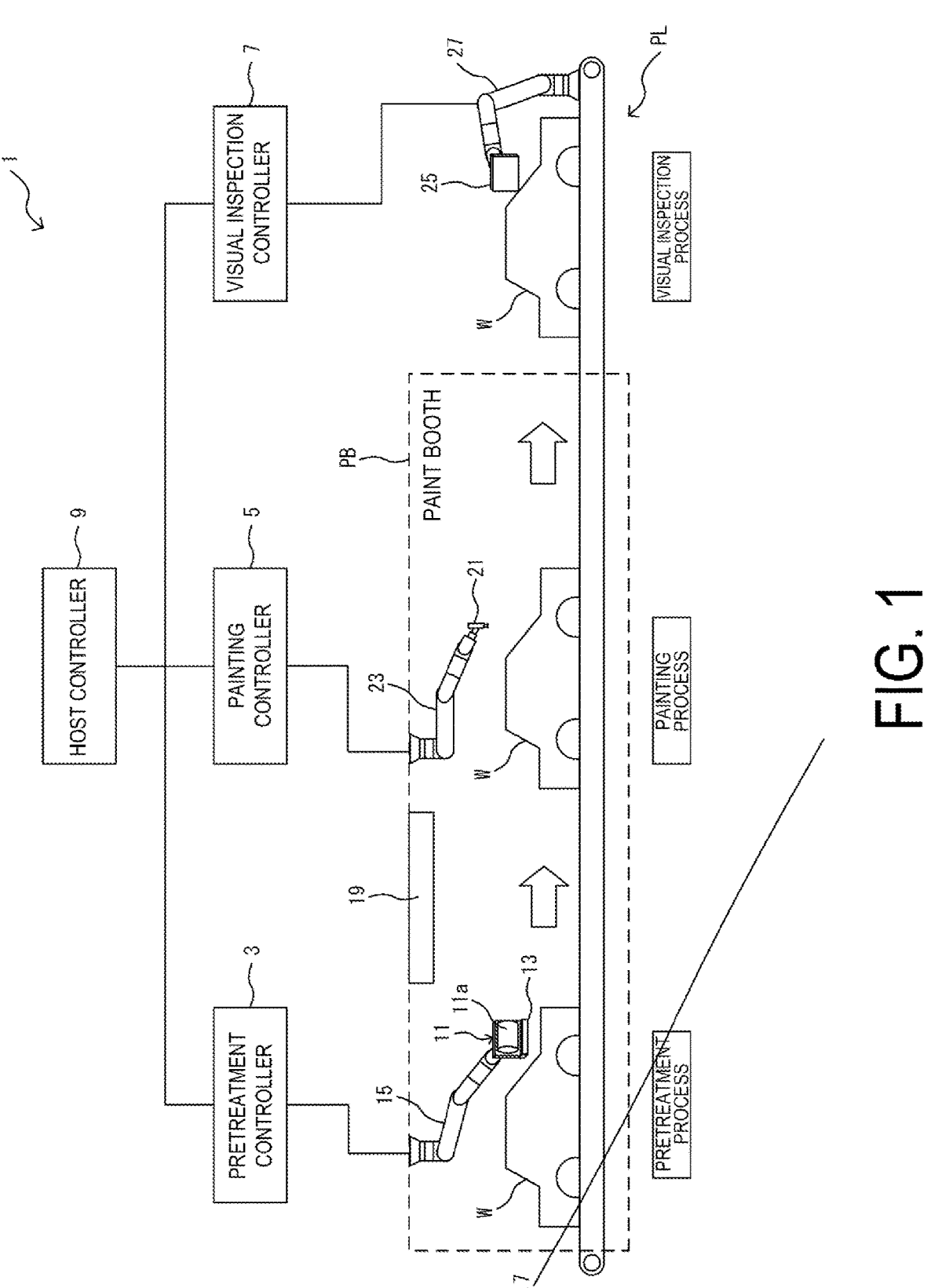
FIG. 1 is a diagram illustrating an example of an overall configuration of a coating diagnosis system according to an embodiment.

As illustrated in FIG. 1, the painting line PL includes a pretreatment process, a painting process, and a visual inspection process. In the pretreatment process, pretreatment is performed on the workpiece W conveyed by a conveyor 17, and in the painting process, painting is performed on the workpiece W on which the pretreatment has been performed, and in the visual inspection process, visual inspection is performed on the workpiece W on which the painting has been performed. In each process, work may be performed while the conveyor 17 continues to convey the workpiece W, or work may be performed with the conveyance of the workpiece W temporarily stopped. The pretreatment process and the painting process are performed in a painting booth PB configured as an explosion-proof area.

The coating diagnosis system 1 includes a pretreatment controller 3, a painting controller 5, a visual inspection controller 7, and a host controller 9.

The pretreatment controller 3 controls individual devices involved in the pretreatment. Examples of the devices involved in the pretreatment include a dust remover 11, a neutralization machine 13, a robot 15, the conveyor 17, and an air conditioner 19. The dust remover 11 rotationally drives a brush 11a to remove dust adhering to a surface of the workpiece W. The neutralization machine 13 generates ions and releases the ions to the workpiece W to remove static electricity from the workpiece W. The robot 15 (an example of an automatic machine) is, for example, a vertical articulated robot (e.g., a six-axis robot with six joints) that is commonly used as an industrial robot, and moves the dust remover 11 and the neutralization machine 13, which are attached to a distal end portion thereof, around the work-piece W, and performs dust removal work and neutralization work (examples of predetermined tasks related to the pre-treatment). The robot 15 is installed so as to be suspended from, for example, a ceiling, a wall, or the like of the painting booth PB. The conveyor 17 (an example of a transport device) conveys the workpiece W along a transport direction (arrow direction in FIG. 1). The air conditioner 19 adjusts temperature, humidity, air volume, and the like in the painting booth PB (an example of an area in which the pretreatment is performed).

Note that a plurality of sets of the robots 15, the dust removers 11, and the neutralization machines 13 may be arranged around the workpiece W, for example, two sets may be arranged on the right and left sides of the workpiece W. The dust remover 11 and the neutralization machine 13 may be attached to different robots 15. The robot 15 may be a robot other than the vertical articulated type. For example, the robot 15 may be a horizontal articulated robot or a parallel link robot, or may be a robot other than a general-purpose robot, such as a dedicated working machine designed exclusively for pretreatment work, which includes an actuator that can move linearly in XYZ directions in the Cartesian coordinate axes and rotate in a 0 direction. The robot 15 may be installed on a floor. Further, in the pre-treatment process, another type of work may be performed in addition to or in place of the dust removal work and the neutralization work.

The pretreatment controller 3 acquires data related to the pretreatment process when pretreatment for painting is per-formed on the workpiece W in the pretreatment process. Examples of the data related to the pretreatment process include coordinates of a distal end position, torques of individual joints, and distal end speed of the robot 15, transport speed or a transport position of the workpiece W, torque or rotation speed (rpm) of the dust remover 11, output of the neutralization machine 13, and environmental data in the painting booth PB. The transport speed or transport position of the workpiece W is detected by, for example, an encoder (not illustrated) installed on a motor (not illustrated) of the conveyor 17. The environmental data in the painting booth PB is, for example, temperature, humidity, air volume (downflow), or the like in the painting booth PB, and is acquired from a command value for the air conditioner 19.

The painting controller 5 controls individual devices involved in the painting. Examples of the devices involved in the painting include a paint gun 21, an air source device 22 (see FIG. 2 below, e.g., a compressor, a solenoid valve, an air regulator), a robot 23, the conveyor 17, and the air conditioner 19. The paint gun 21 mixes paint supplied from a paint tank and air supplied from the air source device 22 to spray the paint onto the workpiece W. The air source device 22 includes, for example, the compressor, the sole-noid valve, and the air regulator. The solenoid valve turns the supply of air from the compressor to the paint gun 21 on and off, and the air regulator controls the air pressure. The robot 23 is, for example, a vertical articulated robot (e.g., a six-axis robot with six joints) that is commonly used as an industrial robot, and moves the paint gun 21 attached to a distal end portion thereof around the workpiece W. The robot 23 is installed so as to be suspended from, for example, a ceiling, a wall, or the like of the painting booth PB.

Note that a plurality of sets of the robots 23 and the paint guns 21 may be arranged around the workpiece W, for example, two sets may be arranged on the right and left sides of the workpiece W. The robot 23 may also be a robot other than the vertical articulated type. For example, the robot 23 may be a horizontal articulated robot or a parallel link robot, or may be a robot other than a general-purpose robot, such as a dedicated working machine designed exclusively for painting work. The robot 23 may be installed on a floor. The painting controller 5 may control the temperature and the like of a drying oven (not illustrated) used for drying after painting.

The painting controller 5 acquires data related to the painting process when the painting is performed on the workpiece W in the painting process. Examples of the data related to the painting process include coordinates of a distal end position, torque of individual joints, and distal end speed of the robot 23, transport speed or a transport position of the workpiece W, air pressure, and drying temperature. The air pressure is acquired from, for example, a command value to the air source device 22, and the drying temperature is acquired from, for example, a command value for the drying oven.

The visual inspection controller 7 controls individual devices involved in the visual inspection. Examples of the devices involved in the visual inspection include an inspec-tion device 25, a robot 27, and the conveyor 17. The inspection device 25 is constituted by, for example, an imaging device such as a camera, a film thickness gauge, or the like. Image recognition processing using, for example, machine learning, deep learning, or the like is applied on an image captured by the imaging device, and the quality of the coating may be diagnosed by using the image. The quality of the coating is diagnosed by determining whether the coating thickness measured by the film thickness gauge is within an appropriate range. The robot 27 is, for example, a vertical articulated robot (e.g., a six-axis robot with six joints) that is commonly used as an industrial robot, and moves the inspection device 25 attached to a distal end portion thereof around the workpiece W. The robot 27 is installed, for example, on a floor.

Note that a plurality of sets of the robots 27 and the inspection devices 25 may be arranged around the work-piece W, for example, two sets may be arranged on the right and left sides of the workpiece W. The robot 27 may be a robot other than the vertical articulated type. For example, the robot 27 may be a horizontal articulated robot or a parallel link robot, or may be a robot other than a general-purpose robot, such as a dedicated working machine designed exclusively for visual inspection work. The robot 27 may be installed so as to be suspended from a ceiling, a wall, or the like of the painting booth PB. In addition, visual inspection other than the image diagnosis and film thickness measurement may be performed. The visual inspection does not necessarily need to be automated, and may be performed by an operator or may be performed jointly by the machine and the operator.

When the visual inspection controller 7 inspects a coating state on the workpiece W in the visual inspection process, the visual inspection controller 7 acquires data related to an inspection result. Examples of the data related to the inspec-tion result include coordinates of a distal end position of the robot 27, the presence or absence of coating defects, and types of coating defects. The types of coating defects include, for example, sagging, poor hiding, seeding, mottling, and orange peel. The sagging means that the paint flows downward and the coating film thickness increases locally. The poor hiding means that the thickness of the coating film is locally thin. The seeding means that foreign matter is mixed into the coating film and forms a protrusion, which impairs the smoothness of the coating film. The mottling means that the color of the coating film is locally uneven. The orange peel means that the coating film has a wavy surface with waves of various sizes. Note that the coating defects described above are examples, and various other types of coating defects may be detected.

The host controller 9 collectively controls the devices of the individual processes in the painting line PL. The host controller 9 acquires the data related to the pretreatment process from the pretreatment controller 3, acquires the data related to the painting process from the painting controller 5, acquires the data related to the inspection result from the visual inspection controller 7, and associated these data with identification information on the corresponding workpiece W and registers these data in a database 51 (see FIG. 2 below). The identification information is not limited as long as the workpiece W can be identified. Examples of the identification information include a serial number, a manufacturing number, and a lot number uniquely assigned to each workpiece W.

The configuration of the coating diagnosis system 1 described above is an example, and is not limited to the contents described above. For example, a post-treatment process may be provided between the painting process and the visual inspection process. In this case, a post-treatment controller may be installed to acquire data related to the post-treatment process when post-treatment is performed on the workpiece W in the post-treatment process. The post-treatment process is, for example, a drying process of drying the workpiece W in a drying oven after painting. The data related to the post-treatment process may include, for example, the temperature of the drying oven.

2. Functional Configurations of Individual Controllers

Figure 2:
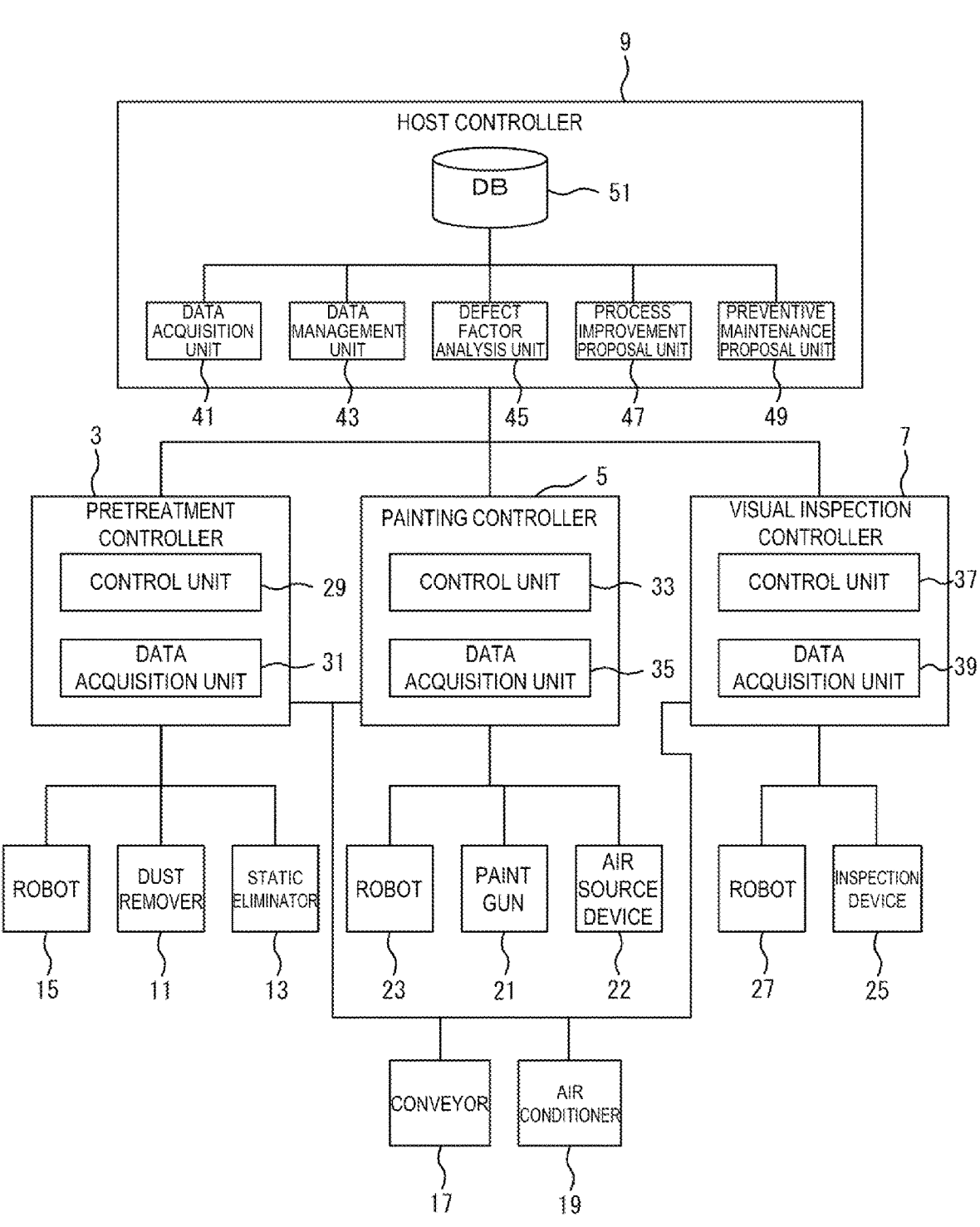
FIG. 2 is a block diagram illustrating an example of functional configurations of individual controllers.

Referring to FIGS. 2 and 3, examples of functional configurations of the pretreatment controller 3, the painting controller 5, the visual inspection controller 7, and the host controller 9 are described.

As illustrated in FIG. 2, the pretreatment controller 3 includes a control unit 29 and a data acquisition unit 31. The control unit 29 controls the dust remover 11, the neutralization machine 13, the robot 15, and the like. The data acquisition unit 31 (an example of a first data acquisition unit) acquires the data related to the pretreatment process when the pretreatment for painting is performed on the workpiece W in the pretreatment process. The data acquisition unit 31 acquires the data related to the pretreatment process for each area on the workpiece W. Specifically, as shown in FIG. 3, the data acquisition unit 31 acquires at least one of the following data related to the pretreatment process: the coordinates of the distal end position, the torque of the individual joints, and the distal end speed of the robot 15, the transport speed (or transport position) of the workpiece W conveyed by the conveyor 17, the torque and rotation speed of the dust remover 11, the output of the neutralization machine 13, and the temperature and humidity (air volume may be included) in the painting booth PB. These data can be detected by command values to the individual devices generated by the control unit 29 and sensors or the like installed in the explosion-proof robot 15, and thus these data can be acquired under an explosion-proof environment. Note that data other than the above may be acquired. The data acquisition unit 31 acquires the above individual data together with the coordinates of the distal end position of the robot 15, for example, for each step of the job performed by the robot 15. The coordinates of the distal end position of the robot 15 can be used for grasping the area on the workpiece W for which each data was acquired.

The painting controller 5 includes a control unit 33 and a data acquisition unit 35. The control unit 33 controls the paint gun 21, the air source device 22, the robot 23, and the like. The data acquisition unit 35 (an example of a second data acquisition unit) acquires the data related to the painting process when the painting is performed on the workpiece W in the painting process. The data acquisition unit 35 acquires the data related to the painting process for each area on the workpiece W. Specifically, as shown in FIG. 3, the data acquisition unit 31 acquires at least one of the following data related to the painting process: the coordinates of the distal end position, the torque of the individual joints, and the distal end speed of the robot 23, the transport speed (or transport position) of the workpiece W conveyed by the conveyor 17, and the air pressure of the air source device 22. These data can be detected by command values to the individual devices generated by the control unit 33 and sensors or the like installed in the explosion-proof robot 23, and thus these data can be acquired under an explosion-proof environment. Note that data other than the above (such as drying temperature) may be acquired. The data acquisition unit 35 acquires the above individual data together with the coordinates of the distal end position of the robot 23, for example, for each step of the job performed by the robot 23. The coordinates of the distal end position of the robot 23 can be used for grasping the area on the workpiece W for which each data was acquired.

The visual inspection controller 7 includes a control unit 37 and a data acquisition unit 39. The control unit 37 controls the inspection device 25, the robot 27, and the like. The data acquisition unit 39 (an example of a third data acquisition unit) acquires the data related to the inspection result when the coating state on the workpiece W is inspected in the visual inspection process. The data acquisition unit 39 acquires the data related to the inspection result for each area on the workpiece W. Specifically, as shown in FIG. 3, the data acquisition unit 39 acquires at least one of the coordinates of the distal end position of the robot 27 and the inspection result as the data related to the inspection result. Note that data other than the above may be acquired. The data acquisition unit 39 acquires the inspection result together with the coordinates of the distal end position of the robot 27, for example, for each step of the job performed by the robot 27. The coordinates of the distal end position of the robot 27 can be used for grasping the area on the workpiece W for which the inspection was performed.

Note that the conveyor 17 and the air conditioner 19 are controlled by some or all of the control unit 29 of the pretreatment controller 3, the control unit 33 of the painting controller 5, and the control unit 37 of the visual inspection controller 7. Alternatively, the conveyor 17 and the air conditioner 19 may be controlled by a dedicated controller separate from the controllers 3, 5, and 7.

The host controller 9 includes a data acquisition unit 41, a data management unit 43, a defect factor analysis unit 45, a process improvement proposal unit 47, and a preventive maintenance proposal unit 49.

The data acquisition unit 41 acquires the data related to the pretreatment process from the pretreatment controller 3, acquires the data related to the painting process from the painting controller 5, and acquires the data related to the inspection result from the visual inspection controller 7. Further, the data acquisition unit 41 (an example of a fourth data acquisition unit) acquires data related to a special note in a process prior to the pretreatment process. A type of the preceding process is not limited as long as the process is performed prior to the pretreatment process in the painting line PL. Examples of the preceding process include a welding process and a cleaning process. Examples of the special note include the presence or absence of defects in the preceding process (e.g., welding defect and cleaning defect in a specific area), the presence or absence of irregular work by the operator (e.g., the operator cleaned or washed a specific area on the workpiece surface), and the presence or absence of a sudden event (intrusion of a person into the painting booth, occurrence of device failure, or the like). As shown in FIG. 3, the special note may be registered as simple data in which the presence or absence of the special note is represented by, for example, 0 (no special note) or 1 (special note present). In this case, detailed contents of the special note may be recorded separately so that the detailed contents may be confirmed as necessary.

The data management unit 43 registers the data related to the pretreatment process, the data related to the painting process, the data related to the inspection result, and the data related to the special note, acquired by the data acquisition unit 41, in the database 51, each in association with the identification information (serial number, etc.) of the corresponding workpiece W.

FIG. 3 shows an example of data contents of the database 51. In the example shown in FIG. 3, for each serial number (1A, 2A, . . . ) of the workpiece W, the data of the individual devices are registered in association with the coordinates (X coordinate, Y coordinate, Z coordinate) of the distal end position of the robot for each of the processes of the pretreatment process, the painting process, and the visual inspection process. Note that in FIG. 3, in each robot, a torque (S) represents a torque of the joint axis (S axis) closest to a base end side, and a torque (T) represents a torque of the joint axis (T axis) closest to a distal end side. Although not shown in FIG. 3, torques are each registered for joint axes between the S axis and the T axis (e.g., L axis, U axis, R axis, and B axis). Data in a case where one robot is installed in each process are shown in FIG. 3 as an example, but in a case where a plurality of robots are installed in each process, the data for the individual devices are registered for each robot with the same serial number. In the example shown in FIG. 3, the presence or absence of the special note is registered for each individual workpiece W. However, the presence or absence of the special note may be registered for each area on the workpiece W (each coordinate of the distal end position of the robot). In a case where the air conditioners 19 are installed separately for the pretreatment process and the painting process, environmental data may also be acquired and registered for the painting process.

In a case where a defect is found in the coating of the workpiece W in the visual inspection process, the defect factor analysis unit 45 analyzes defect factors on the basis of at least one of the data related to the pretreatment process, the data related to the painting process, and the data related to the special note, which are each associated with the serial number of the workpiece W. In this case, the defect factor analysis unit 45 may prioritize the data to be analyzed as follows. For example, first the defect factors in the painting process are analyzed on the basis of the data related to the painting process, and in a case where the painting process is determined to be normal, then the defect factors in the pretreatment process are analyzed on the basis of the data related to the pretreatment process, and in a case where the pretreatment process is determined to be normal, finally the defect factors are analyzed on the basis of the data related to the special note. The priority may be changed according to the type of defect factor found. By analyzing the data in the order in which the defect factors are most likely to be present in this manner, the efficiency of analysis can be improved and the processing load can be reduced. The analysis result by the defect factor analysis unit 45 may be displayed on a display device, recorded on an appropriate recording medium, or transmitted to another device, for example. An alarm or a warning may be output in accordance with the analysis result.

Specifically, for example, in a case where a coating defect (e.g., sagging) is found in a specific area on the workpiece W in the visual inspection process, and the distal end speed of the robot 23 tends to decrease at the corresponding area in the painting process, or the transport speed of the conveyor 17 tends to decrease during the painting of the corresponding area, the defect factor analysis unit 45 may infer that the defect factor is that the paint has flowed downward due to a local increase in coating film thickness caused by a decrease in the relative speed of the paint gun 21 to the workpiece W.

For example, in a case where a coating defect (e.g., poor hiding) is found in a specific area on the workpiece W in the visual inspection process, and the distal end speed of the robot 23 tends to increase at the corresponding area in the painting process, or the transport speed of the conveyor 17 tends to increase during the painting of the corresponding area, the defect factor analysis unit 45 may infer that the defect factor is that the coating film has thinned due to an increase in the relative speed of the paint gun 21 to the workpiece W. In this case, in a case where the defect factor analysis unit 45 determines that there is no problem in the painting process, the defect factor analysis unit 45 analyzes the data related to the pretreatment process. In a case where the output of the neutralization machine 13 is low at the corresponding area, the defect factor analysis unit 45 may infer that the paint did not sufficiently adhere to the corresponding area on the workpiece W due to insufficient neutralization.

For example, in a case where a coating defect (e.g., seeding) is found in a specific area on the workpiece W in the visual inspection process, and the torque of the dust remover 11 tends to be low at the corresponding area in the pretreatment process, the defect factor analysis unit 45 may infer that the defect factor is that the dust was not sufficiently removed due to insufficient contact of the brush 11a of the dust remover 11 with the workpiece W. Note that, in a case where the type of coating defect is seeding as described above, the defect factor is likely to be in the pretreatment process, so the priority may be changed so that the data related to the pretreatment process is prioritized over the data related to the painting process.

For example, in a case where a coating defect (e.g., mottling) is found in a specific area on the workpiece W in the visual inspection process, and the distal end speed of the robot 23 tends to fluctuate at the corresponding area in the painting process, or the transport speed of the conveyor 17 tends to fluctuate during the painting of the corresponding area, the defect factor analysis unit 45 may infer that the defect factor is an uneven thickness of the coating film due to the fluctuation in the relative speed of the paint gun 21 to the workpiece W. In this case, in a case where the defect factor analysis unit 45 determines that there is no problem in the painting process, the defect factor analysis unit 45 analyzes the data related to the pretreatment process. In a case where the distal end speed of the robot 15 tends to fluctuate at the corresponding area in the pretreatment process, or the transport speed of the conveyor 17 tends to fluctuate during neutralization of the corresponding area, the defect factor analysis unit 45 may infer that the defect factor is the non-uniformity of neutralization due to the fluctuation in the relative speed of the neutralization machine 13 to the workpiece W.

For example, in a case where a coating defect (e.g., orange peeling) is found in the entire or part of the workpiece W in the visual inspection process, and the downward air volume in the painting booth PB tends to be high, the defect factor analysis unit 45 may infer that the defect factor is that the solvent evaporates too quickly in the painting process. In a case where the humidity of the painting booth PB tends to be low, static electricity is easily generated. Thus, the defect factor analysis unit 45 may infer that the defect factor is that the static electricity was not uniformly eliminated from the workpiece W in the pretreatment process.

For example, in a case where a coating defect (e.g., cissing) is found in a specific area on the workpiece W in the visual inspection process, and the defect factor analysis unit 45 determines that there is no problem in either the painting process or the pretreatment process, the defect factor analysis unit 45 may analyze the data related to the special note and infer that the defect factor is oil adhesion due to, for example, a cleaning defect occurring at the corresponding area in the cleaning process or irregular work performed by the operator at the corresponding area.

The process improvement proposal unit 47 proposes an improvement with respect to operating conditions of the device involved in the pretreatment process or the painting process on the basis of the analysis result of the defect factor analysis unit 45. The process improvement proposal unit 47 may also propose an improvement related to the process prior to the pretreatment process. The contents of the proposal made by the process improvement proposal unit 47 may be displayed on a display device, recorded on an appropriate recording medium, or transmitted to another device, for example. An alarm or a warning may be output in accordance with the proposed contents.

Specifically, in a case where the defect factor analysis unit 45 infers that the distal end speed of the robot 23 decreasing at the corresponding area in the painting process or the transport speed of the conveyor 17 decreasing during painting of the corresponding area is the factor of the coating defect (e.g., sagging), the process improvement proposal unit 47 may propose a process improvement with changing the condition setting, such as increasing the distal end speed of the robot 23, increasing the transport speed of the conveyor 17, or the like at the corresponding area.

For example, in a case where the defect factor analysis unit 45 infers that the distal end speed of the robot 23 increasing at the corresponding area in the painting process or the transport speed of the conveyor 17 increasing during the painting of the corresponding area is the factor of the coating defect (e.g., poor hiding), the process improvement proposal unit 47 may propose a process improvement with changing the condition setting, such as reducing the distal end speed of the robot 23 at the corresponding area, or reducing the transport speed of the conveyor 17. In a case where the defect factor analysis unit 45 infers that there is no problem in the painting process and the output of the neutralization machine 13 being low at the corresponding area in the pretreatment process is the defect factor, the process improvement proposal unit 47 may propose a process improvement with changing the condition setting, such as increasing the output of the neutralization machine 13 at the corresponding area.

For example, in a case where the defect factor analysis unit 45 infers that the torque of the dust remover 11 being low at the corresponding area in the pretreatment process is the factor of the coating defect (e.g., seeding), the process improvement proposal unit 47 may propose a process improvement with changing the condition setting, such as changing the position of the dust remover 11 (coordinates of the distal end position of the robot 15) at the corresponding area to a position where the brush 11a sufficiently comes into contact with the workpiece W.

For example, in a case where the defect factor analysis unit 45 infers that the distal end speed of the robot 23 fluctuating at the corresponding area in the painting process or the transport speed of the conveyor 17 fluctuating during the painting of the corresponding area is the factor of the coating defect (e.g., mottling), the process improvement proposal unit 47 may propose a process improvement with changing the condition setting, such as stabilizing the distal end speed of the robot 23 at the corresponding area, or stabilizing the transport speed of the conveyor 17. In a case where the defect factor analysis unit 45 infers that there is no problem in the painting process and the distal end speed of the robot 15 fluctuating at the corresponding area in the pretreatment process or the transport speed of the conveyor 17 fluctuating during the neutralization of the corresponding area is the factor of the coating defect, the process improvement proposal unit 47 may propose a process improvement with changing the condition setting, such as stabilizing the distal end speed of the robot 15 at the corresponding area or stabilizing the transport speed of the conveyor 17.

For example, in a case where the defect factor analysis unit 45 infers that a large amount of air volume in the painting booth PB is the factor of coating defect (e.g., orange peeling), the process improvement proposal unit 47 may propose a process improvement with changing the condition setting, such as lowering the air volume in the painting booth PB. Alternatively, in a case where the defect factor analysis unit 45 infers that low humidity in the painting booth PB is the factor of the coating defect (e.g., orange peeling), the process improvement proposal unit 47 may propose a process improvement with changing the condition setting, such as increasing the humidity in the painting booth PB.

The preventive maintenance proposal unit 49 proposes preventive maintenance for the device involved in the pretreatment process or the device involved in the painting process on the basis of the data related to the pretreatment process or the data related to the painting process. The contents of the proposal made by the preventive maintenance proposal unit 49 may be displayed on a display device, recorded on an appropriate recording medium, or transmitted to another device, for example. An alarm or a warning may be output in accordance with the proposed contents.

Specifically, in a case where the torque of the dust remover 11 exceeds a predetermined value and tends to increase in the pretreatment process, the preventive maintenance proposal unit 49 may propose to replace the dust remover 11. This allows the dust remover 11 to be replaced before it malfunctions or is damaged, so that an accidental stoppage of the painting line PL and occurrence of defects in the workpiece W can be prevented. In addition, the dust remover 11 can be made maximum use of compared to a case where the dust remover 11 is replaced on a regular basis.

Note that the individual processing units described above are not limited to these examples of processing assignments. For example, it may be processed by a smaller number of processing units (e.g., one processing unit), or may be processed by further subdivided processing units. The functions executed by the individual processing units of the host controller 9 may be implemented by a program to be executed by a CPU 901 (see FIG. 7) described below, or some or all of the functions may be implemented by an actual device such as an ASIC, FPGA, or other electrical circuits.

3. Controller Processing Procedure

Figure 4:
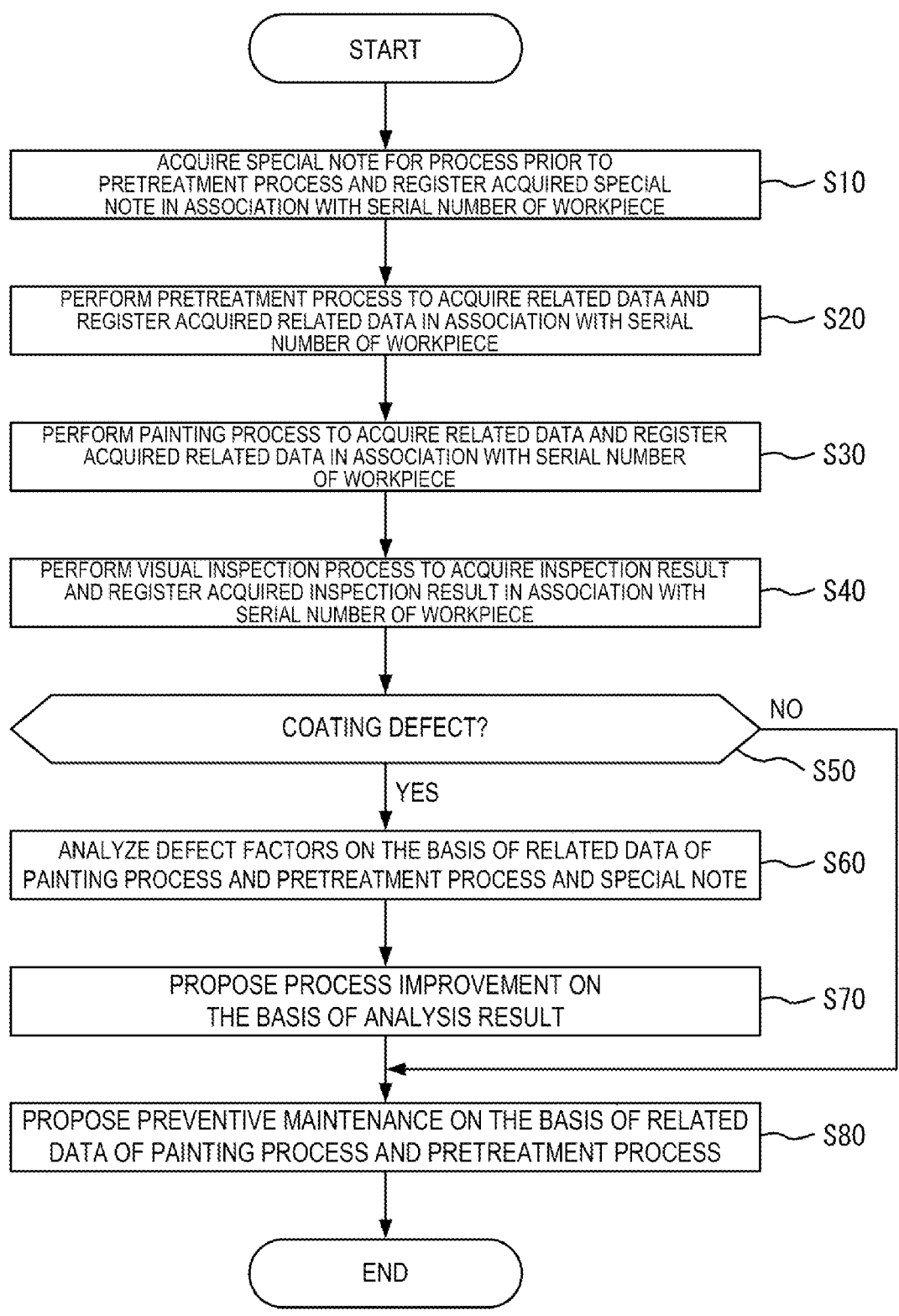
FIG. 4 is a flowchart illustrating an example of a processing procedure executed by a host controller.

Referring to FIG. 4, an example of a processing procedure executed by the host controller 9 is described.

In step S10, the host controller 9 acquires the data related to the special note for the process prior to the pretreatment process by the data acquisition unit 41, and registers the data related to the special note in the database 51 in association with the serial number of the workpiece W by the data management unit 43.

In step S20, the host controller 9 executes the pretreatment process on the workpiece W via the pretreatment controller 3, acquires the data related to the pretreatment process from the pretreatment controller 3 by the data acquisition unit 41, and registers the acquired data in the database 51 in association with the serial number of the workpiece W by the data management unit 43.

In step S30, the host controller 9 executes the painting process on the workpiece W via the painting controller 5, acquires the data related to the painting process from the painting controller 5 by the data acquisition unit 41, and registers the acquired data in the database 51 in association with the serial number of the workpiece W by the data management unit 43.

In step S40, the host controller 9 executes the visual inspection process on the workpiece W via the visual inspection controller 7, acquires the data related to the inspection result from the visual inspection controller 7 by the data acquisition unit 41, and registers the acquired data in the database 51 in association with the serial number of the workpiece W by the data management unit 43.

In step S50, the host controller 9 determines the presence or absence of the coating defect on the basis of the data related to the inspection result acquired in step S40. In a case where there is no coating defect (NO in step S50), the process proceeds to step S80 described below. On the other hand, in a case where there is a coating defect (YES in step S50), the process proceeds to a next step S60.

In step S60, the host controller 9 analyzes the defect factors by the defect factor analysis unit 45 on the basis of at least one of the data related to the pretreatment process, the data related to the painting process, and the data related to the special note, which are each associated with the serial number of the workpiece W with the coating defect. The analysis result may be displayed, recorded, transmitted, or the like. Further, an alarm, a warning, or the like may be output in accordance with the analysis result.

In step 570, the host controller 9 proposes an improvement with respect to the operating conditions of the device involved in the pretreatment process or the painting process, or an improvement related to the process prior to the pretreatment process, on the basis of the analysis result in step S60 by the process improvement proposal unit 47. The proposed contents may be displayed, recorded, transmitted, or the like. Further, an alarm, a warning, or the like may be output in accordance with the proposed contents.

In step S80, the host controller 9 proposes, by the preventive maintenance proposal unit 49, the preventive maintenance for the device involved in the pretreatment process or the device involved in the painting process on the basis of the data related to the pretreatment process or the data related to the painting process. The proposed contents may be displayed, recorded, transmitted, or the like. Further, an alarm, a warning, or the like may be output in accordance with the proposed contents. The flowchart then ends.

The processing procedure described above is an example, and at least some of the procedures may be deleted or modified, or a procedure other than the above may be added. The order of at least some of the procedures may be changed, or a plurality of procedures may be combined into a single procedure.

4. Effects of the Embodiment

As described above, in the coating diagnosis system 1 of the present embodiment, when the pretreatment for painting is performed on the workpiece W in the pretreatment process in the painting line PL, the data acquisition unit 31 of the pretreatment controller 3 acquires the data related to the pretreatment process, and the data management unit 43 of the host controller 9 registers the data related to the pretreatment process in association with the serial number of the workpiece W. This allows the data related to the processes in the painting line PL, including the pretreatment process, to be centrally managed in association with the workpiece W. As a result, in a case where a coating defect is found in the workpiece W, it is possible to analyze the defect factors in the pretreatment process on the basis of the data related to the pretreatment process, propose an improvement to the pretreatment process, and the like, thereby contributing to efficient improvement of the process in the painting line PL.

In the present embodiment, the coating diagnosis system 1 may further include the data acquisition unit 35 configured to acquire the data related to the painting process when the painting is performed on the workpiece W in the painting process after the pretreatment process, and the data management unit 43 may register the data related to the painting process together with the data related to the pretreatment process in association with the serial number of the workpiece W.

In this case, the data related to the individual processes in the painting line PL, including the pretreatment process and the painting process, can be centrally managed in association with the workpiece W. As a result, in a case where a coating defect is found in the workpiece W, it is possible to analyze the defect factors in the painting process on the basis of the data related to the painting process, propose an improvement with respect to the painting process, and the like, thereby contributing to efficient improvement of the process in the painting line PL.

In the present embodiment, the coating diagnosis system 1 may further include the data acquisition unit 39 configured to acquire the data related to the inspection result when the coating state on the workpiece W is inspected in the visual inspection process after the painting process, and the data management unit 43 may register the data related to the inspection result together with the data related to the pretreatment process and the data related to the painting process in association with the serial number of the workpiece W.

In this case, the data related to the individual processes in the painting line PL, including the pretreatment process and the painting process, and the inspection result data of the coating state can be centrally managed in association with the workpiece W. As a result, in a case where a coating defect is found in the workpiece W, it is possible to analyze the defect factors in the pretreatment process or the painting process on the basis of the data related to the pretreatment process or the data related to the painting process associated with the inspection result, propose an improvement with respect to the pretreatment process or painting process, and the like, thereby contributing to efficient improvement of the individual processes constituting the painting line PL.

In the present embodiment, the coating diagnosis system 1 may further include the defect factor analysis unit 45 configured to analyze the defect factors on the basis of at least one of the data related to the pretreatment process and the data related to the painting process, which are each associated with the serial number of the workpiece W, in a case where a defect is found in the coating on the workpiece W in the visual inspection process.

In this case, the defect factors can be efficiently analyzed regardless whether the factors of the defective coating on the workpiece are in the pretreatment process, the painting process, or both of these processes.

In the present embodiment, the defect factor analysis unit 45 may analyze the defect factors in the painting process on the basis of the data related to the painting process, and in a case where the painting process is determined to be normal, the defect factor analysis unit 45 may analyze the defect factors in the pretreatment process on the basis of the data related to the pretreatment process.

In this case, in a case where the painting process is determined to be normal, the pretreatment process can be diagnosed, and in a case where a defect factor is found in the painting process, the diagnosis of the pretreatment process can be omitted or the like. That is, the diagnosis of individual processes can be prioritized. In this way, the processing load can be reduced compared to a case where, for example, both the pretreatment process and the painting process are always diagnosed.

In the present embodiment, the coating diagnosis system 1 may further include the process improvement proposal unit 47 configured to propose the improvement with respect to the operating condition of the device involved in the pretreatment process or the painting process on the basis of the analysis result of the defect factor analysis unit 45.

In this case, in a case where a defect is found in the coating on the workpiece W, effective improvements can be proposed for the individual processes constituting the painting line PL.

In the present embodiment, the coating diagnosis system 1 may further include the preventive maintenance proposal unit 49 configured to propose the preventive maintenance for the device involved in the pretreatment process or the device involved in the painting process on the basis of the data related to the pretreatment process or the data related to the painting process.

In this case, effective preventive maintenance can be proposed for the devices used in the individual processes constituting the painting line PL. This allows the individual devices to be replaced before they malfunction or are damaged, preventing an accidental stoppage of the painting line PL and occurrence of defects in the workpiece W. In addition, the individual devices can be made maximum use of compared to a case where the individual devices are replaced on a regular basis.

In the present embodiment, the data acquisition unit 31 may acquire the data related to the pretreatment process for each area on the workpiece W.

In this case, for example, in a case where a coating defect is found in a specific area on the workpiece W, it is possible to analyze the defect factors in the pretreatment process on the basis of the data related to the pretreatment process corresponding to the specific area, propose an improvement with respect to a defect factor in the pretreatment process corresponding to the specific area, and the like. This enables efficient analysis of the factors of the coating defect and efficient improvement of the individual processes constituting the painting line PL.

In the present embodiment, in the pretreatment process, the articulated robot 15 may perform a predetermined task related to the pretreatment on the workpiece W. The data acquisition unit 31 may acquire at least one of the distal end position, the joint torque, and the distal end speed of the robot 15 as the data related to the pretreatment process.

In this case, it is possible to analyze the defect factors in the pretreatment process and propose the process improvement on the basis of the data related to the robot 15 operating in the pretreatment process. For example, in a case where a coating defect (e.g., mottling) is found at a specific area on the workpiece W in the visual inspection process, and the distal end speed of the robot 15 tends to fluctuate at the corresponding area, it can be inferred that the defect factor is the non-uniformity of neutralization due to the fluctuation of the relative speed of the neutralization machine 13 to the workpiece W. In that case, it is possible to propose a process improvement with changing the condition setting, for example, stabilizing the distal end speed of the robot 15 and the like at the corresponding area.

In the present embodiment, in the pretreatment process, the pretreatment may be performed on the workpiece W conveyed by the conveyor 17, and the data acquisition unit 31 may acquire the transport speed or the transport position of the workpiece W conveyed by the conveyor 17 as the data related to the pretreatment process.

In this case, it is possible to analyze the defect factors in the pretreatment process and propose a process improvement on the basis of the data related to the conveyor 17 operating in the pretreatment process. For example, in a case where a coating defect (e.g., mottling) is found at a specific area on the workpiece W in the inspection process, and the transport speed of the conveyor 17 tends to fluctuate during neutralization at the corresponding area in the pretreatment process, it can be inferred that the defect factor is the non-uniformity of neutralization due to the fluctuation of the relative speed of the neutralization machine 13 to the workpiece W. In that case, it is possible to propose a process improvement with changing the condition setting, for example, stabilizing the transport speed of the conveyor 17 and the like in the pretreatment process.

In the present embodiment, in the pretreatment process, the dust removal work for removing dust from the surface of the workpiece W may be performed by the dust remover 11 that rotationally drives the brush 11*a*, and the data acquisition unit 31 may acquire at least one of the torque and the rotation speed of the dust remover 11 as the data related to the pretreatment process.

In this case, it is possible to analyze the defect factors in the pretreatment process and propose a process improvement on the basis of the data related to the dust remover 11 operating in the pretreatment process. For example, in a case where a coating defect (e.g., seeding) is found at the specific area on the workpiece W in the visual inspection process, and the torque of the dust remover 11 tends to be low at the corresponding area, it can be inferred that the defect factor is that dust was not sufficiently removed due to insufficient contact of the brush 11a of the dust remover 11 with the workpiece W. In that case, it is possible to propose a process improvement with changing the condition setting, for example, changing the position of the dust remover 11 at the corresponding area to a position where the brush 11a sufficiently comes into contact with the workpiece W.

In the present embodiment, in the pretreatment process, the neutralization work for removing the static electricity from the workpiece W may be performed by the neutralization machine 13, and the data acquisition unit 31 may acquire the output of the neutralization machine 13 as the data related to the pretreatment process.

In this case, it is possible to analyze the defect factors in the pretreatment process and propose a process improvement on the basis of the data related to the neutralization machine 13 operating in the pretreatment process. For example, in a case where a coating defect (e.g., poor hiding) is found at a specific area on the workpiece W in the visual inspection process, and the output of the neutralization machine 13 tends to be low at the corresponding area, it can be inferred that the defect factor is that the paint did not adhere sufficiently due to insufficient neutralization at the corresponding area on the workpiece W. In that case, it is possible to propose a process improvement with changing the condition setting, for example, increasing the output of the neutralization machine 13 at the corresponding area and the like.

In the present embodiment, the data acquisition unit 31 may acquire at least one of the temperature, humidity, and air volume in the painting booth PB as the data related to the pretreatment process.

In this case, it is possible to analyze the defect factors in the pretreatment process and propose a process improvement on the basis of the environmental data in the painting booth PB. For example, in a case where a coating defect (e.g., orange peeling) is found in the entire or part of the workpiece W in the visual inspection process, and the downward air volume in the painting booth PB tends to be high, it can be inferred that the defect factor is too rapid evaporation of the solvent in the painting process. In that case, it is possible to propose a process improvement with changing the condition setting, for example, reducing the air volume in the painting booth PB and the like. Alternatively, in a case where the humidity in the painting booth PB tends to be low, it can be inferred that the defect factor is that the static electricity was not uniformly eliminated from the workpiece W in the pretreatment process because static electricity was easily generated. In that case, it is possible to propose a process improvement with changing the condition setting, for example, increasing the humidity in the painting booth PB and the like.

In the present embodiment, the coating diagnosis system 1 may further include the data acquisition unit 41 configured to acquire the data related to the special note in the process prior to the pretreatment process. In that case, the data management unit 43 may register the data related to the special note together with the data related to the pretreatment process and the like in association with the serial number of the workpiece W.

In this case, as the special note, data related to the presence or absence of welding defects or cleaning defects, the presence or absence of irregular work by the operator, and the like can be registered in the form of bits or the like. Then, for example, in a case where a coating defect is found, it is possible to analyze the defect factors in the process prior to the pretreatment process and propose an improvement with respect to the preceding process on the basis of the data related to the special note.

In the present embodiment, the workpiece W may be the body of the automobile. In this case, the data related to the individual processes constituting the painting line PL for the body of the automobile can be centrally managed in association with the individual bodies.

5. Modified Examples

The embodiment of the present disclosure is not limited to the above, and various modifications are possible without departing from the spirit and technical ideas of the present disclosure. Such modified examples will be described below.

5-1. Pretreatment Process Performed Outside Explosion-Proof Area

Figure 5:
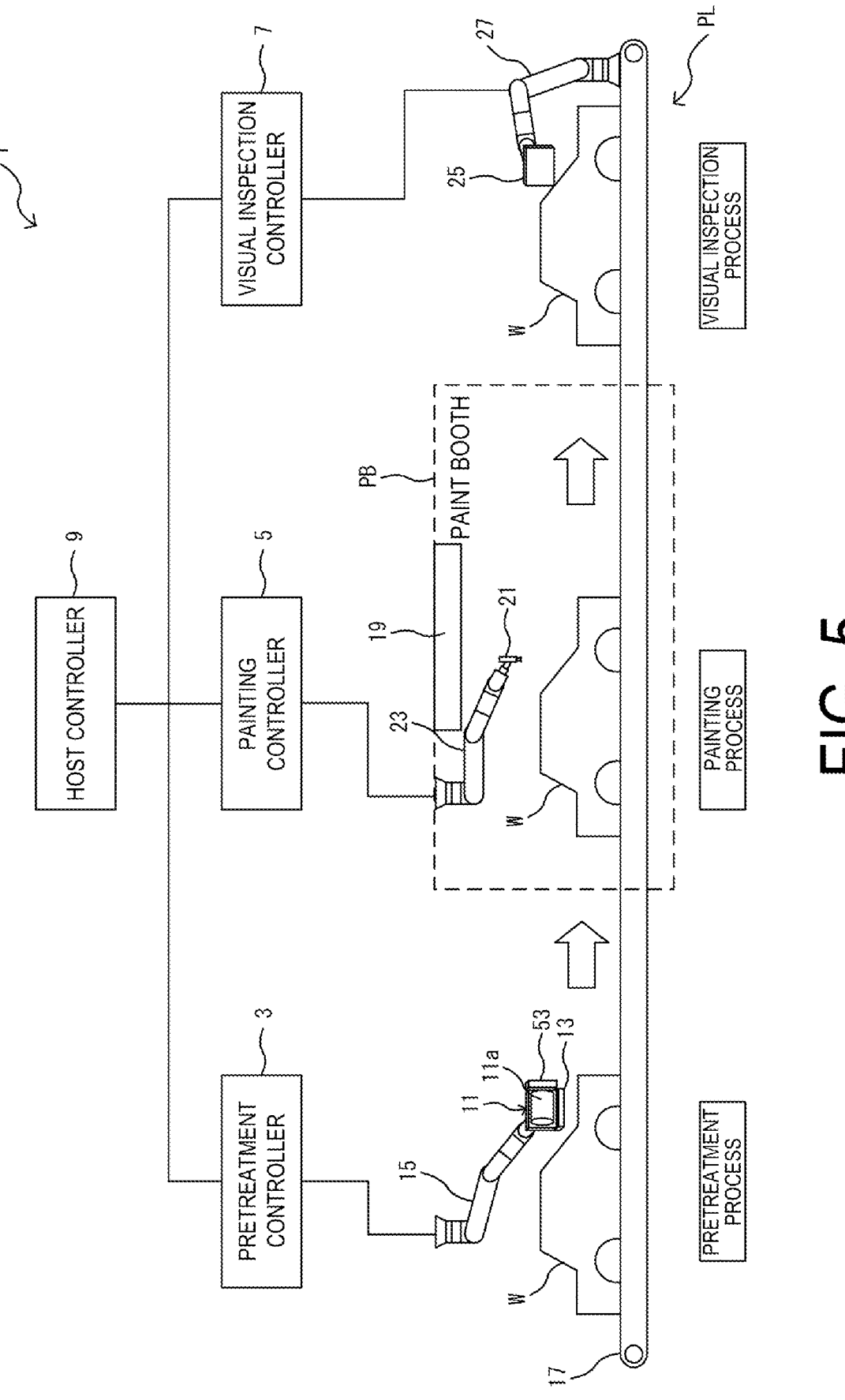
FIG. 5 is a diagram illustrating an example of an overall configuration of a coating diagnosis system in a modified example in which a pretreatment process is performed outside an explosion-proof area.

In the embodiment described above, a case has been described in which the pretreatment process and the painting process are performed in the painting booth PB, which is the explosion-proof area. However, for example, as illustrated in FIG. 5, the pretreatment process may be performed outside the painting booth PB. In this case, a non-explosion-proof special sensor installed outside the device can be used in the pretreatment process. For example, as illustrated in FIG. 5, an electrostatic sensor 53 may be installed at the distal end portion of the robot 15 in addition to the dust remover 11 and the neutralization machine 13 to detect an amount of charge on the workpiece W after the neutralization work in the pretreatment process. The data acquisition unit 31 of the pretreatment controller 3 also acquires the amount of charge on the workpiece W as data related to the pretreatment process. As shown in FIG. 6, the data management unit 43 of the host controller 9 registers the amount of charge on the workpiece W in the database 51 in association with the serial number of the corresponding workpiece W.

According to the present modified example, in a case where a coating defect (e.g., poor hiding) is found at a specific area in the visual inspection process, and the amount of charge on the workpiece W tends to be high at the corresponding area, the defect factor analysis unit 45 can infer that the defect factor is that the paint did not adhere sufficiently due to the high amount of charge. In that case, the process improvement proposal unit 47 can propose a process improvement with changing the condition setting, for example, increasing the output of the neutralization machine 13 at the corresponding area and the like so that the amount of charge on the corresponding area becomes lower. In addition to the detection of the amount of charge described above, various processes using special sensors that cannot be used in an explosion-proof area can be performed in the pretreatment process.

5-2. Case of Obtaining Amount or Size of Dust Removed

Although the dust is not detected in the embodiment described above, for example, a configuration may be possible in which the dust removed by the dust remover 11 can be sucked and collected by a filter. The collected dust may be detected by a laser sensor, a camera, or the like, and the data management unit 43 may monitor the amount of dust collected for each workpiece by, for example, adding up the number of detections, measuring the total weight of the dust collected, measuring the size of the dust collected, or the like. The weight of the dust may be detected by measuring the weight of the filter. The data acquisition unit 31 acquires at least one of the amount and size of dust removed by the dust remover 11, and the data management unit 43 registers the amount and size of dust in the database 51 in association with the serial number of the corresponding workpiece W.

According to the present modified example, it is possible to analyze the defect factors in the pretreatment process on the basis of the amount or size of the dust acquired, and utilize an analysis result for process improvement and preventive maintenance. For example, even in a case where the workpieces W are of the same type, and an amount or size of dust thereof is extremely different from each other, the defect factor analysis unit 45 can detect the possibility of an irregularity occurred in the pretreatment process. In a case where the amount of dust collected tends to decrease, the defect factor analysis unit 45 may infer that the cause is wear of the brush 11$a$ of the dust remover 11 or clogging of the filter, and the preventive maintenance proposal unit 49 may propose replacement of the brush 11$a$ or the filter.

5-3. Case of Obtaining Sound Data

For example, in a case where the pretreatment process is performed outside the painting booth PB, a sound input device such as a microphone may be installed in the pretreatment process to acquire sound data as data related to the pretreatment process. The data management unit 43 registers the sound data in the database 51 in association with the serial number of the corresponding workpiece W. This makes it possible to detect the actual air volume under the work environment, for example, by detecting wind sound due to the downflow, compared to a case where the air volume is obtained by using the command value. Further, for example, in a case where an unusual sound different from the normal work sound is detected, it is possible to detect a possibility that some kind of failure or malfunction has occurred.

6. Example of Hardware Configuration of Host Controller

An example of a hardware configuration of the host controller 9 will be described with reference to FIG. 7.

Figure 7:
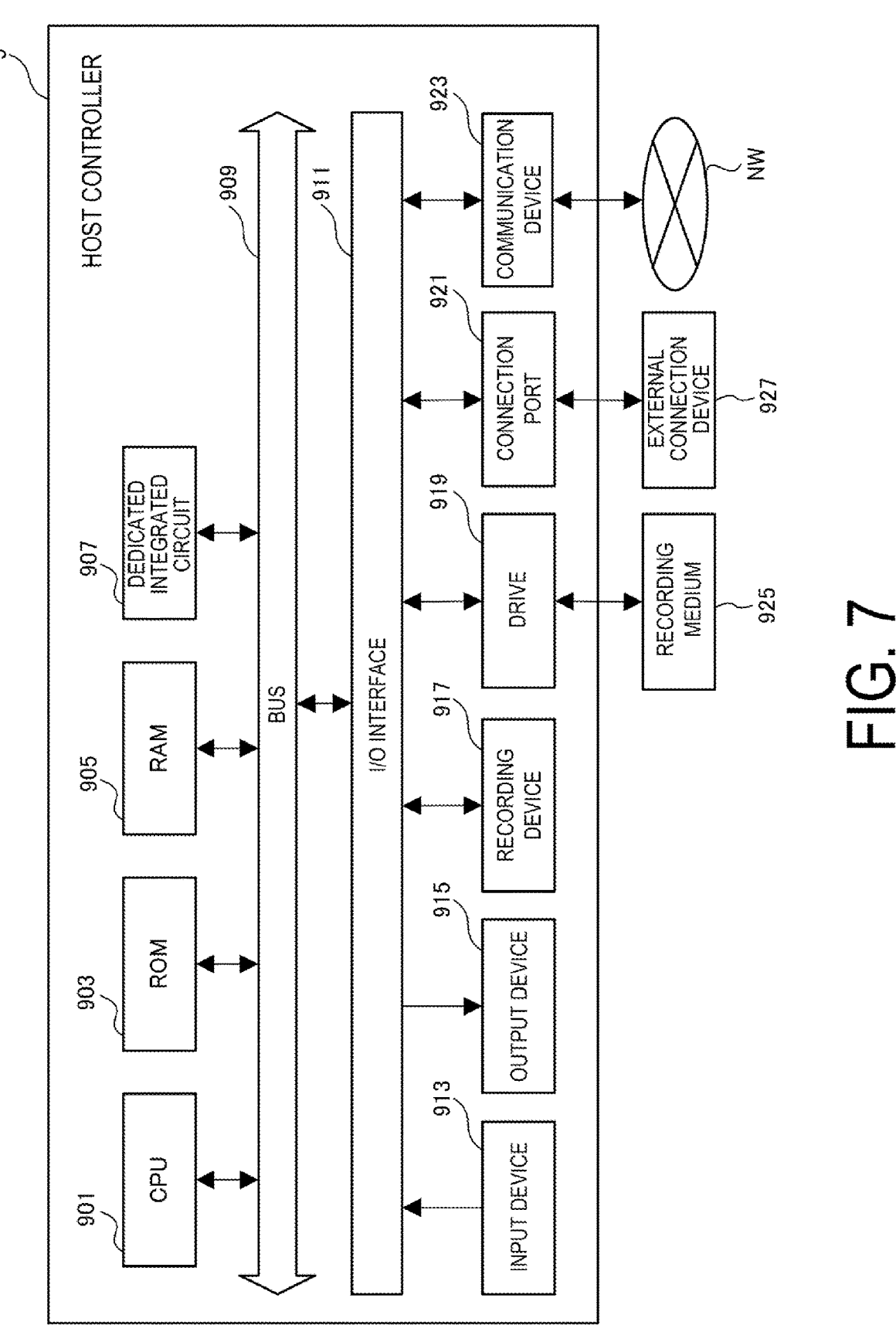
FIG. 7 is a block diagram illustrating an example of a hardware configuration of the host controller.

As illustrated in FIG. 7, the host controller 9 includes the CPU 901, a ROM 903, a RAM 905, a dedicated integrated circuit 907 built for a particular application such as an ASIC or FPGA, an input device 913, an output device 915, a recording device 917, a drive 919, a connection port 921, and a communication device 923. These components are connected in a manner allowing signals to be transmitted to one another via a bus 909 or an I/O interface 911.

The program can be recorded on, for example, the ROM 903, the RAM 905, or the recording device 917 such as a hard disk.

The program can be temporarily or non-temporarily (permanently) recorded on a removable recording medium 925, examples of which include magnetic disks such as flexible disks, optical disks such as various CDs, MO disks, and DVDs, and semiconductor memories. The recording medium 925 configured in such a manner can be provided as so-called package software. In this case, the program recorded on the recording medium 925 can be read out by the drive 919 and recorded on the recording device 917 via the I/O interface 911, the bus 909, and the like.

The program can be recorded on, for example, a download site, another computer, or another recording device (not illustrated). In this case, the program is transferred via a network NW, such as a LAN or the Internet, and the communication device 923 receives this program. The program received by the communication device 923 may be recorded on the recording device 917 via the I/O interface 911, the bus 909, and the like.

The program can be recorded, for example, on an appropriate external connection device 927. In this case, the program may be transferred via the connection port 921 as appropriate and recorded on the recording device 917 via the I/O interface 911, the bus 909, and the like.

The CPU 901 executes various kinds of processing according to the program recorded on the recording device 917 to implement various kinds of processing executed by the data acquisition unit 41, the data management unit 43, the defect factor analysis unit 45, the process improvement proposal unit 47, the preventive maintenance proposal unit 49, and the like. For example, the CPU 901 may directly read the program from the recording device 917 and execute the program, or may load the program into the RAM 905 once and execute the program. When the CPU 901 receives the program, for example, via the communication device 923, the drive 919, or the connection port 921, the CPU 901 may directly execute the received program without recording the received program on the recording device 917.

As necessary, the CPU 901 may execute various kinds of processing on the basis of signals and information input from the input device 913, examples of which include a mouse, a keyboard, a microphone (not illustrated) and the like.

The CPU 901 may output the result of executing the various kinds of processing from the output device 915, such as a display device or an audio output device. The CPU 901 may transmit the processing result via the communication device 923 or the connection port 921 as necessary. The CPU 901 may record the processing result on the recording device 917 or the recording medium 925.

In addition to what has already been described above, the techniques according to the embodiment and the modified examples may be used in combination as appropriate. Also, while examples are not described, various modifications may be made to the above-described embodiments or modified examples within a range that does not depart from the technical scope thereof.

The problems to be solved by the above-described embodiment and modified examples and effects are not limited to the contents described above. The embodiment, the modified examples, or the like may solve a problem not described above or produce an effect not described above, or may solve only some of the described problems or produce only some of the described effects.

REFERENCE SIGNS LIST

1 Coating diagnosis system
11 Dust remover
11$a$ Brush
13 Neutralization machine
15 Robot (automatic machine)
17 Conveyor (transport device)
31 Data acquisition unit (first data acquisition unit)
35 Data acquisition unit (second data acquisition unit)
39 Data acquisition unit (third data acquisition unit)
41 Data acquisition unit (fourth data acquisition unit)
43 Data management unit 45 Defect factor analysis unit
47 Process improvement proposal unit
49 Preventive maintenance proposal unit
PB Paint booth (area in which pretreatment is performed)
PL Painting line
W Workpiece

The invention claimed is:

1. A coating diagnosis system comprising:
a pretreatment robot;
a painting robot;
one or more memories storing computer instructions; and
one or more processors configured to execute the computer instructions to cause the coating diagnosis system to:
acquire data related to a pretreatment process together with coordinates of a distal end of the pretreatment robot performing pretreatment for painting, wherein
the pretreatment is performed on a workpiece prior to painting by the painting robot in a painting line,
in the pretreatment process, a dust remover configured to rotationally drive a brush performs dust removal operation of removing dust from a surface of the workpiece, and
the acquired data related to the pretreatment process includes at least one of torque and rotation speed of the dust remover,
register the acquired data related to the pretreatment process in association with identification information on the workpiece and the coordinates, and
upon detecting a defect in coating on an area in the workpiece after a painting process, analyze defect factors based on part of the registered data related to the pretreatment process associated with the identification information and some of the coordinates corresponding to the area.

2. The coating diagnosis system according to claim 1, wherein the one or more processors are configured to further execute the computer instructions to cause the coating diagnosis system to register data related to the painting process together with the data related to the pretreatment process in association with the identification information.

3. The coating diagnosis system according to claim 2, wherein the one or more processors are configured to further execute the computer instructions to cause the coating diagnosis system to register data related to an inspection result together with the data related to the pretreatment process and the data related to the painting process in association with the identification information.

4. The coating diagnosis system according to claim 3, wherein the one or more processors are configured to further execute the computer instructions to cause the coating diagnosis system to propose preventive maintenance for a device involved in the pretreatment process or a device involved in the painting process based on the data related to the pretreatment process or the data related to the painting process.

5. The coating diagnosis system according to claim 1, wherein the one or more processors are configured to further execute the computer instructions to cause the coating diagnosis system to:
analyze two or more of the defect factors in the painting process based on data related to the painting process, and
upon determining that the painting process is normal, analyze two or more of the defect factors in the pretreatment process based on the data related to the pretreatment process.

6. The coating diagnosis system according to claim 5, wherein the one or more processors are configured to further execute the computer instructions to cause the coating diagnosis system to propose an improvement with respect to an operating condition of a device involved in the pretreatment process or the painting process based on an analysis result of the defect factors.

7. The coating diagnosis system according to claim 1, wherein
the workpiece includes one or more areas, and
the one or more processors are configured to further execute the computer instructions to cause the coating diagnosis system to acquire the data related to the pretreatment process for each of the one or more areas of the workpiece.

8. The coating diagnosis system according to claim 1, wherein
in the pretreatment process, the pretreatment robot with articulated structure performs a predetermined task related to the pretreatment on the workpiece, and
the one or more processors are configured to further execute the computer instructions to cause the coating diagnosis system to acquire at least one of joint torque and distal end speed of the pretreatment robot as the data related to the pretreatment process.

9. The coating diagnosis system according to claim 1, wherein
in the pretreatment process, the pretreatment is performed on the workpiece being transported by a transport device, and
the one or more processors are configured to further execute the computer instructions to cause the coating diagnosis system to acquire transport speed or a transport position of the workpiece transported by the transport device as the data related to the pretreatment process.

10. The coating diagnosis system according to claim 1, wherein the one or more processors are configured to further execute the computer instructions to cause the coating diagnosis system to acquire at least one of an amount and size of the dust removed by the dust remover as the data related to the pretreatment process.

11. The coating diagnosis system according to claim 1, wherein the one or more processors are configured to further execute the computer instructions to cause the coating diagnosis system to acquire at least one of temperature, humidity, and air volume in an area in which the pretreatment is performed on the workpiece as the data related to the pretreatment process.

12. The coating diagnosis system according to claim 1, wherein the one or more processors are configured to further execute the computer instructions to further cause the coating diagnosis system to:
acquire data related to a special note in a process prior to the pretreatment process, and
register the data related to the special note together with the data related to the pretreatment process in association with the identification information.

13. The coating diagnosis system according to claim 1, wherein the workpiece is a body of an automobile.

14. A coating diagnosis method performed by a coating diagnosis system including a pretreatment robot, a painting robot, one or more memories storing computer instructions to perform the coating diagnosis method, and one or more processors configured to execute the computer instructions, the coating diagnosis method comprising:

acquiring data related to a pretreatment process together with coordinates of a distal end of the pretreatment robot performing pretreatment for painting, wherein the pretreatment is performed on a workpiece prior to painting by the painting robot in a painting line, in the pretreatment process, a dust remover configured to rotationally drive a brush performs dust removal operation of removing dust from a surface of the workpiece, and the acquired data related to the pretreatment process includes at least one of torque and rotation speed of the dust remover;

registering the acquired data related to the pretreatment process in association with identification information on the workpiece and the coordinates; and upon detecting a defect in coating on an area in the workpiece after a painting process, analyzing defect factors based on part of the registered data related to the pretreatment process associated with the identification information and some of the coordinates corresponding to the area.

15. A coating diagnosis system comprising:

a pretreatment robot;

a painting robot;

one or more memories storing computer instructions; and one or more processors configured to execute the computer instructions to cause the coating diagnosis system to:

acquire data related to a pretreatment process together with coordinates of a distal end of the pretreatment robot performing pretreatment for painting, wherein the pretreatment is performed on a workpiece prior to painting by the painting robot in a painting line, in the pretreatment process, a neutralization machine performs neutralization work for removing static electricity from the workpiece, and the acquired data related to the pretreatment process includes output of the neutralization machine, register the acquired data related to the pretreatment process in association with identification information on the workpiece and the coordinates, and upon detecting a defect in coating on an area in the workpiece after a painting process, analyze defect factors based on part of the registered data related to the pretreatment process associated with the identification information and some of the coordinates corresponding to the area.

16. The coating diagnosis system according to claim 15, wherein in the pretreatment process, after the neutralization work, an amount of charge on the workpiece is detected, and the one or more processors are configured to further execute the computer instructions to cause the coating diagnosis system to acquire the amount of charge on the workpiece as the data related to the pretreatment process.

* * * * *